(No Model.) 2 Sheets—Sheet 2.

M. L. METZGER & A. COOPER.
CLUTCH.

No. 331,524. Patented Dec. 1, 1885.

WITNESSES
Edwin L. Bradford
W. H. Wills

INVENTORS
Martin L. Metzger and Albert Cooper
By Toulmin + Semmes
Their Attorneys.

N. PETERS. Photo-Lithographer, Washington, D. C.

UNITED STATES PATENT OFFICE.

MARTIN L. METZGER AND ALBERT COOPER, OF HARRISBURG, PENNSYLVANIA, ASSIGNORS TO W. O. HICKOK, OF SAME PLACE.

CLUTCH.

SPECIFICATION forming part of Letters Patent No. 331,524, dated December 1, 1885.

Application filed October 26, 1885. Serial No. 180,999. (No model.)

*To all whom it may concern:*

Be it known that we, MARTIN L. METZGER and ALBERT COOPER, citizens of the United States, residing at Harrisburg, in the county of Dauphin and State of Pennsylvania, have invented certain new and useful Improvements in Clutches, of which the following is a specification, reference being had therein to the accompanying drawings.

This invention relates to certain new and useful improvements in clutches; and it has for its object to provide a clutch which will be firm and positive in its action, and at the same time is so constructed that its members will not release their grip the one upon the other save when they reach a predetermined position. It has been found in practice that there is a necessity in certain classes of machinery for a clutch which will act as above—for instance, in machines for punching metal or other material, &c. As heretofore constructed the operator when he desires to stop the machine throws the clutch mechanism out of gear and immediately the machine stops, but often leaving the plunger and its tool partially or wholly within the hole it has just stamped out, so that the material cannot be removed until the operator has by hand either removed the tool or raised the plunger and tool out of the hole formed a sufficient distance to admit of the ready removal of the material acted upon.

Figure 1:
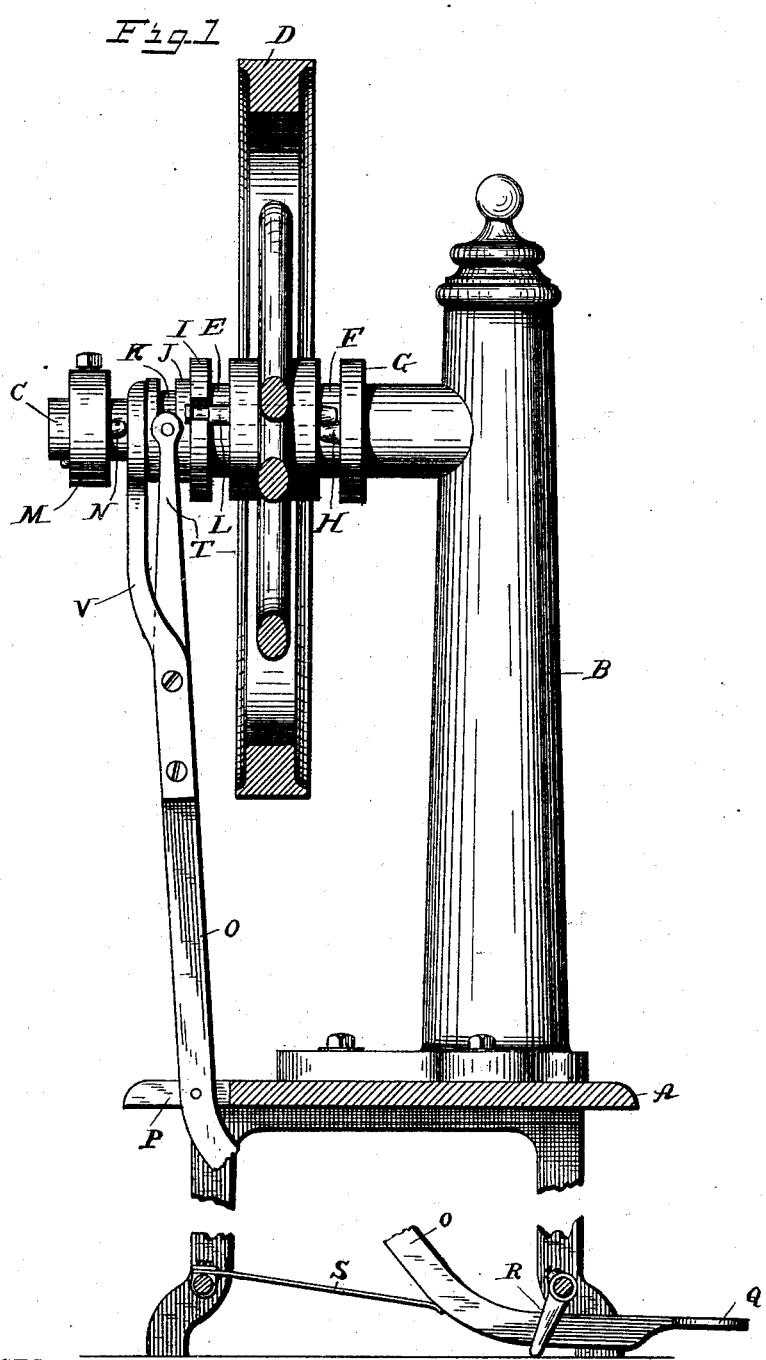
Figure 2:
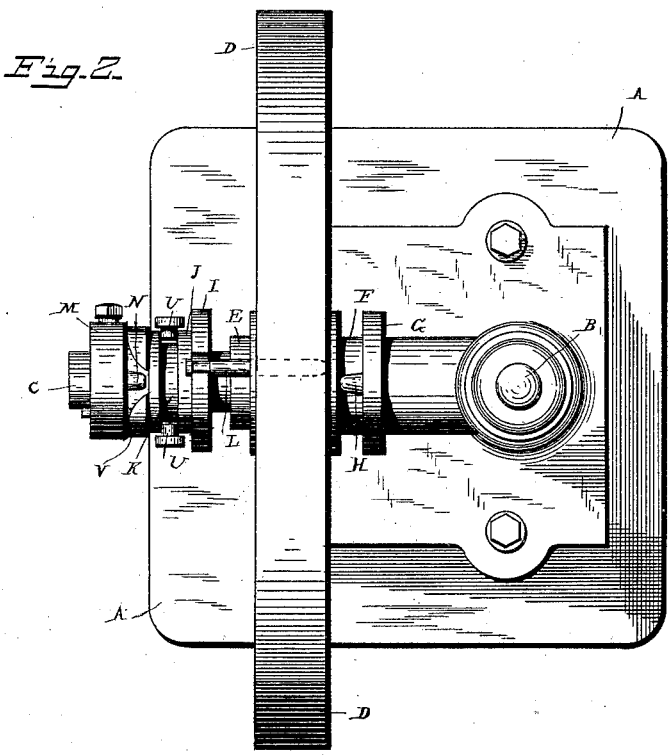
Figure 3:
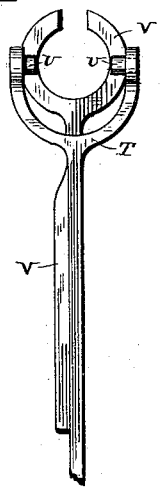

In the accompanying drawings, forming a part of this specification, and on which similar letters of reference indicate the same or corresponding features, Figure 1 represents a side elevation of our improved clutch with its members united and as it is in operative condition; Fig. 2, a plan view thereof, showing its members disunited; and Fig. 3, a detail view showing the formation of the upper end of the lever used for uniting and disuniting the members of the clutch.

The letter A designates a table of any suitable construction, on which is mounted a standard, B, through which extends a shaft, C. Loosely mounted on the shaft C is a pulley, D, held in place by the collars E and F, rigidly secured to the shaft. The collar F terminates on one side in a disk, G, of larger diameter than the collar, and said disk is provided near its periphery with a short stout stud, H. The shaft is further provided on the opposite side of the wheel with another disk, I, loosely mounted thereon, and having an extension, J, which is smaller in diameter than the disk, and has a groove, K, the purpose of which will hereinafter appear. This disk I is slotted near its periphery, and is provided with a pin, L, which is securely held therein by having its head upset. Opposite the slot the hub of the wheel is correspondingly bored to admit of the reception of this pin, and which, as seen in Fig. 1, extends through and engages the stud H of the disk G on the opposite side of the wheel. The shaft near its end C is provided with another collar, M, rigidly secured thereto by means of a set-screw and key. This collar is also provided with a short stout stud, N, similar to the stud H, already described.

The letter O designates the lever, pivotally fastened in the slot P in the table, having its lower end curved, and terminating in a foot-piece, Q, and it is attached to a cross-bar connecting the front table-legs together by means of a slotted arm, R. To the cross-bar uniting the rear table-legs is securely fastened a spring, S, which normally bears against the lever O and keeps the members of the clutch disunited, as seen in Fig. 2. The upper end of the lever terminates in a bifurcated extension, T, as more fully seen in Fig. 3, which loosely and partially embraces the shaft, and its respective members are provided with lugs U, which fit into the groove K, whose office will presently appear. At about the periphery of the wheel D the lever is provided with a further bifurcated extension, V, which also loosely embraces the shaft C, and whose upper ends nearly meet, but terminate each on one side in a gradual curve, and into the recess thus formed fits, when the clutch is not in operation, the stud N.

The operation of our clutch is as follows: When the operator desires to unite the respective members of the clutch, he presses his foot on the end Q of the lever, which, by reason of its pivotal connection at P, throws the lever toward the standard B. The pin L passes all the way through the hub of the wheel, and engages the stud H on the disk G. This disk, it will be remembered, is rigidly connected with the shaft, and the wheel in order to turn must turn the disk and shaft together. At the same time the stud N has passed beyond the recess formed by the separated members of the extension V, and though the operator may raise his foot it is impossible for the clutch to be thrown out of position until the recess is again reached, when, by reason of the pressure of the spring S, the lever will withdraw the pin L and disunite the members of the clutch. The stud N is relatively arranged with whatever punching or stamping mechanism is used, so that when it is on the upper side of the shaft the stamping mechanism will have reached its farthest upward stroke, and thus have entirely cleared the material operated upon, and it is only in this position that the clutch members can again become disunited, because at this point alone is there a recess wherein the stud can play.

We intend to use this clutch more especially in connection with our improved machine for trimming the corners of books, and on which an application was filed even date herewith; but it is obvious that it may be applied to any other form of machinery.

Having thus fully described our invention, what we claim as new, and desire to secure by Letters Patent, is—

1. In a clutch, the combination, with a collar secured to the shaft and provided with a stud, of another collar provided with a pin, and a lever to throw the pin into engagement with the stud.

2. In a clutch, the combination, with a collar secured to the shaft and having a disk provided with a stud, of another collar provided with a pin, and a lever to throw the pin into engagement with the stud.

3. In a clutch, the combination, with a collar secured to the shaft and provided with a stud, of another collar provided with a pin, and a wheel provided with an aperture through which the pin passes, and a lever to throw the pin through the wheel and into engagement with the stud.

4. In a clutch, the combination, with a collar secured to the shaft and having a disk provided with a stud, of another collar provided with a pin, and a wheel provided with an aperture through which the pin passes, and a lever to throw the pin into engagement with the stud.

5. In a clutch, the combination, with the collar secured to the shaft and provided with a stud, of another collar provided with a pin, and a third collar provided with a stud, whereby the lever automatically throws the pin into engagement with the stud.

6. In a clutch, the combination, with a collar secured to the shaft and having a disk provided with a stud, of another collar provided with a pin, and a third collar provided with a stud, by means of which the lever throws the pin into engagement with the stud.

7. In a clutch, the combination, with a collar secured to the shaft and having a disk provided with a stud, of another collar provided with a disk and pin, and a third collar secured to the shaft and provided with a stud, by means of which the lever automatically throws the pin into engagement with the stud.

8. In a clutch, the combination, with a collar rigidly secured to the shaft and provided with a stud, of another collar loosely mounted on the shaft and provided with a pin, and a third collar rigidly secured to the shaft and provided with a stud, by means of which the lever automatically throws the pin into engagement with the stud.

9. In a clutch, the combination, with a collar secured to the shaft and provided with a stud, of another collar provided with a pin, and a wheel provided with an aperture through which the pin passes, and a third collar secured to the shaft and provided with a stud, whereby the lever automatically throws the pin through the wheel and into engagement with the stud.

10. In a clutch, the combination, with a collar secured to a shaft and having a disk provided with a stud, of another collar provided with a pin, and a wheel provided with an aperture through which the pin passes, and a third collar secured to the shaft and provided with a stud, by means of which the lever automatically throws the pin through the wheel and into engagement with the stud.

11. In a clutch, the combination, with a collar secured to the shaft and having a disk provided with a stud, of another collar provided with a disk and a pin, a wheel provided with an aperture through which the pin passes, and a third collar secured to the shaft and provided with a stud, by means of which the lever automatically throws the pin into engagement with the stud.

12. In a clutch, the combination, with a collar secured to the shaft and having a disk provided with a stud, of another collar provided with a disk having a slot in which fits a pin, a wheel provided with an aperture through which the pin passes, and a third collar secured to the shaft and provided with a stud, by means of which the lever automatically throws the pin into engagement with the stud.

13. In a clutch, the combination, with a collar secured to the shaft and provided with a stud, and another collar provided with a pin, of the lever having a bifurcated extension, the members of which fit within a groove on one of the collars, by means of which the pin is automatically thrown into engagement with the stud.

14. In a clutch, the combination, with the collar secured to the shaft and provided with a stud, and another collar provided with a pin, of the lever having a bifurcated extension the members of which are provided with lugs which fit within a groove on one of the collars, by means of which the pin is automatically thrown into engagement with the stud.

15. In a clutch, the combination, with a collar secured to the shaft and provided with a stud, and another collar provided with a pin, of the lever having two bifurcated extensions the members of one of which fit within a groove on one of the collars, and the members of the other of which nearly meet and are tapered toward their extremities.

16. In a clutch, the combination, with the collar secured to the shaft and provided with a stud, and another collar provided with a pin, of the lever having two bifurcated extensions, the members of one of which are provided with lugs which fit within a groove on one of the collars, and the members of the other of which nearly meet and are tapered toward their extremities.

17. In a clutch, the combination, with the stud secured to the shaft and a collar provided with a pin, of a lever to throw the pin into engagement with the stud.

18. In a clutch, the combination, with the stud secured to the shaft and a collar provided with a pin, of a lever to automatically throw the pin into engagement with the stud.

19. In a clutch, the combination, with the stud secured to the shaft and a collar provided with a pin which engages the stud, of a lever which will at a predetermined point throw the pin out of engagement with the stud.

20. In a clutch, the combination, with the stud secured to the shaft and the pin which engages the stud, of the lever which will at a predetermined point throw the pin out of engagement with the stud.

21. In a clutch, the combination, with the stud secured to the shaft and the pin which engages the stud, of the lever which will at a predetermined point automatically throw the pin out of engagement with the stud.

In testimony whereof we affix our signatures in presence of two witnesses.

MARTIN L. METZGER.
ALBERT COOPER.

Witnesses:
D. C. MAURER,
H. S. REINHOLD.